(12) United States Patent
Yasuhara

(10) Patent No.: US 11,520,543 B2
(45) Date of Patent: Dec. 6, 2022

(54) IMAGE FORMING APPARATUS, PRINTING SYSTEM, CONTROL METHOD, AND STORAGE MEDIUM

(71) Applicant: CANON KABUSHIKI KAISHA, Tokyo (JP)

(72) Inventor: Hiroshi Yasuhara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/205,494

(22) Filed: Mar. 18, 2021

(65) Prior Publication Data
US 2021/0294546 A1    Sep. 23, 2021

(30) Foreign Application Priority Data
Mar. 23, 2020    (JP) .............................. JP2020-051244

(51) Int. Cl.
*G06F 3/12* (2006.01)
(52) U.S. Cl.
CPC .......... *G06F 3/1232* (2013.01); *G06F 3/1222* (2013.01); *G06F 3/1231* (2013.01); *G06F 3/1288* (2013.01)
(58) Field of Classification Search
None
See application file for complete search history.

(56) References Cited

U.S. PATENT DOCUMENTS

| 2012/0188583 A1* | 7/2012 | Stone | G06F 3/1288 |
| | | | 358/1.14 |
| 2017/0039011 A1* | 2/2017 | Suzuki | G06F 3/1209 |
| 2018/0027146 A1* | 1/2018 | Kato | H04N 1/00228 |
| | | | 358/1.14 |

FOREIGN PATENT DOCUMENTS

JP    2019-126988 A    8/2019

* cited by examiner

*Primary Examiner* — Frantz Bataille
(74) *Attorney, Agent, or Firm* — Canon U.S.A., Inc. IP Division

(57) ABSTRACT

A printing apparatus, that performs communication via a secure first network and communication via a second network, receives print data from a first terminal apparatus connected to the first network, via the first network, or from a second terminal apparatus connected to the second network, via the second network, and transmits information for the print data to at least either one of a first server that performs communication via the first network and a second server that performs communication via the second network, based on through which of the first and the second networks the print data has been received. In the printing apparatus, in a case where the print data is received via the first network, the information for the print data is transmitted to the first server via the first network, without via the second network.

11 Claims, 14 Drawing Sheets

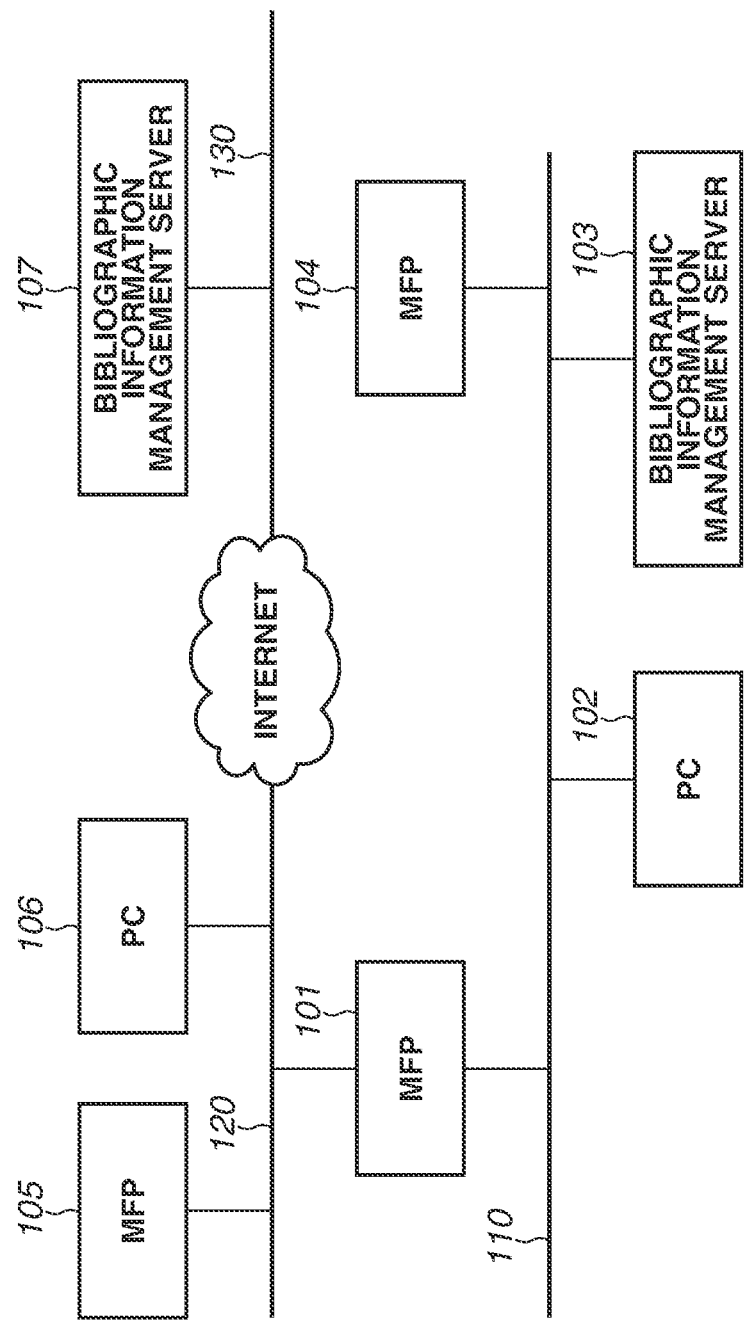

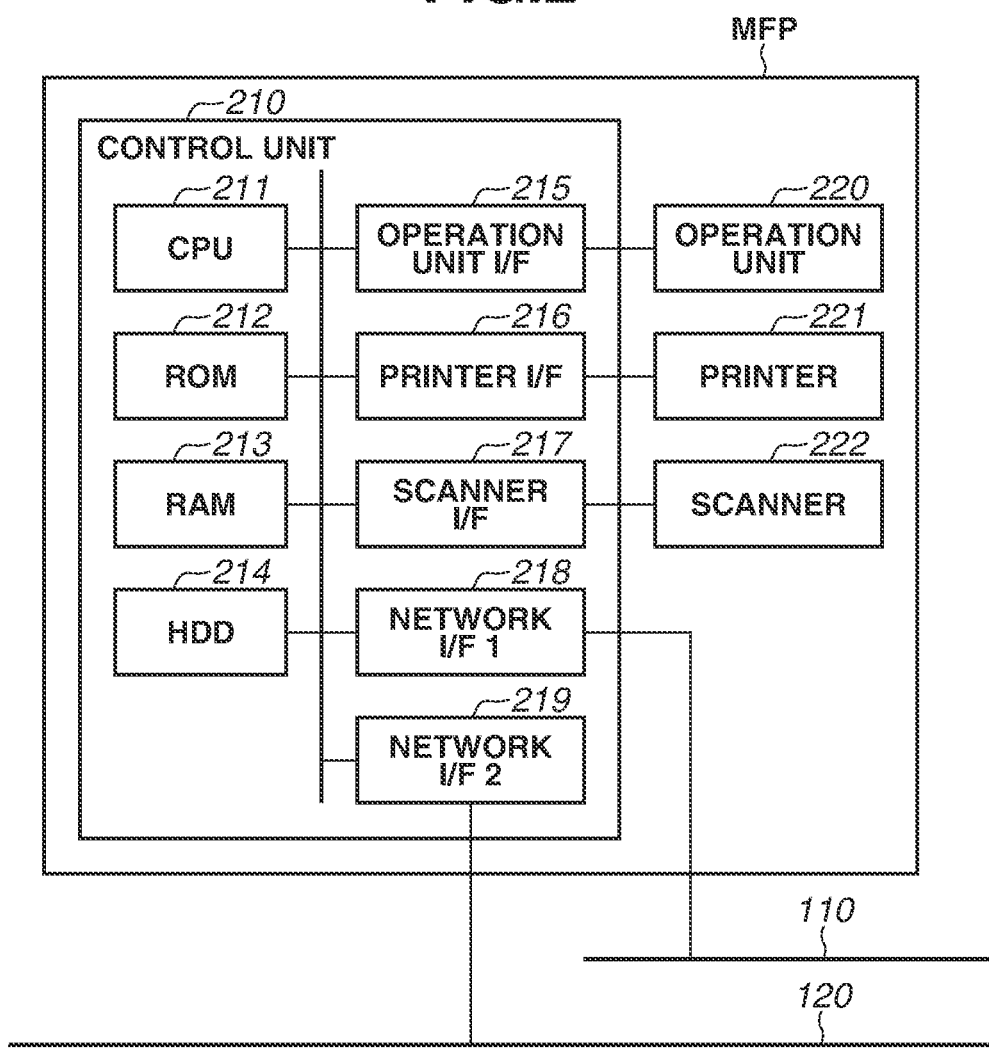

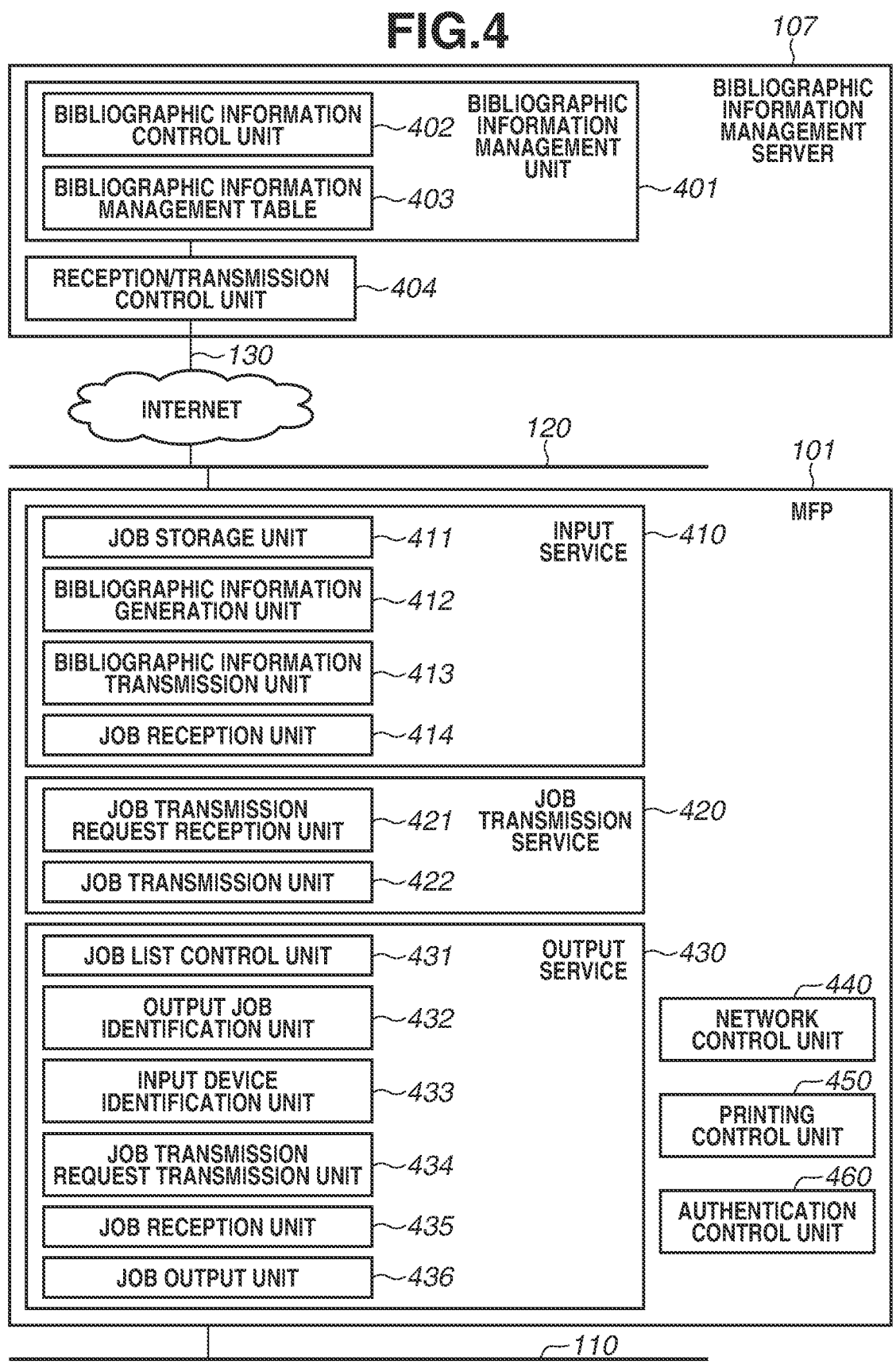

FIG.5

```
Job ID: MFP101_1111
Document Name: Document A
SubmitDate: DEC. 1, 2019, 2:00 P.M.
Size: 100Kbyte
User Name: UserA
Job Setting: Color, Duplex, A4
JobHolder: MFP101
```

| | 601 | 602 | 603 | 604 | 605 | 606 |
|---|---|---|---|---|---|---|
| | ID | Document Name | Submit Date | UserName | JobSetting | JobHolder |
| | MFP101_1111 | Document A | DEC. 1, 2019, 2:00 P.M. | UserA | Color, Duplex, A4 | MFP 101 (LAN120) |
| | MFP101_1112 | Document B | DEC. 1, 2019, 2:02 P.M. | UserA | BW, Simplex, A4 | MFP 101 (LAN120) |
| | MFP101_1113 | Document C | DEC. 1, 2019, 3:15 P.M. | UserB | Color, Simplex, A3 | MFP 101 (LAN120) |
| | MFP101_1118 | Document H | DEC. 1, 2019, 5:00 P.M. | UserB | BW, Duplex, A4 | MFP 101 (LAN120) |

610

| | 611 | 612 | 613 | 614 | 615 | 616 |
|---|---|---|---|---|---|---|
| | ID | Document Name | Submit Date | UserName | JobSetting | JobHolder |
| | MFP101_1114 | Document D | DEC. 1, 2019, 4:00 P.M. | UserC | BW, Duplex, A4 | MFP 101 (LAN110) |
| | MFP101_1115 | Document E | DEC. 1, 2019, 4:30 P.M. | UserB | Color, Simplex, A3 | MFP 101 (LAN110) |
| | MFP101_1116 | Document F | DEC. 1, 2019, 4:42 P.M. | UserA | BW, Duplex, A4 | MFP 101 (LAN110) |
| | MFP101_1117 | Document G | DEC. 1, 2019, 4:50 P.M. | UserA | Color, Simplex, A4 | MFP 101 (LAN110) |

< AUTHENTICATION >

USER ID　　　[　　　　　] ~701

PASSWORD　[　　　　　] ~702

[LOG IN] ~703

710

< JOB LIST >

| SELECTION | DOCUMENT NAME | DATE AND TIME OF REGISTRATION | SETTING |
|---|---|---|---|
| ■ | DocumentA | DEC. 1, 2019, 2:00 P.M. | COLOR, DUPLEX, A4 |
| ☐ | DocumentB | DEC. 1, 2019, 2:00 P.M. | BW, SIMPLEX, A4 |
|  |  |  |  |
|  |  |  |  |

~711

712~[DELETE] [PRINT]~713

720

< JOB LIST >

| SELECTION | DOCUMENT NAME | DATE AND TIME OF REGISTRATION | SETTING |
|---|---|---|---|
| ■ | DocumentF | DEC. 1, 2019, 4:42 P.M. | BW, DUPLEX, A4 |
| ☐ | DocumentG | DEC. 1, 2019, 4:50 P.M. | COLOR, SIMPLEX, A4 |
|  |  |  |  |
|  |  |  |  |

~721

722~[DELETE] [PRINT]~723

```
Job ID: MFP101_1111
Document Name: Document A
SubmitDate: DEC. 1, 2019, 2:00 P.M.
Size: 100Kbyte
User Name: UserA
Job Setting: Color, Duplex, A4
JobHolder: MFP101_LAN120
```

1202

```
Job ID: MFP101_1111
Document Name: Document A
SubmitDate: DEC. 1, 2019, 2:00 P.M.
Size: 100Kbyte
User Name: UserA
Job Setting: Color, Duplex, A4
JobHolder: MFP101_LAN110
```

| ID | Document Name | Submit Date | UserName | JobSetting | JobHolder |
|---|---|---|---|---|---|
| MFP101_1111 | Document A | DEC. 1, 2019, 2:00 P.M. | UserA | Color, Duplex, A4 | MFP 101 (LAN120) |
| MFP101_1112 | Document B | DEC. 1, 2019, 2:02 P.M. | UserA | BW, Simplex, A4 | MFP 101 (LAN120) |
| MFP101_1113 | Document C | DEC. 1, 2019, 3:15 P.M. | UserB | Color, Simplex, A3 | MFP 101 (LAN120) |
| MFP101_1118 | Document H | DEC. 1, 2019, 5:00 P.M. | UserB | BW, Duplex, A4 | MFP 101 (LAN120) |

1310

| ID | Document Name | Submit Date | UserName | JobSetting | JobHolder |
|---|---|---|---|---|---|
| MFP101_1111 | Document A | DEC. 1, 2019, 2:00 P.M. | UserA | Color, Duplex, A4 | MFP 101 (LAN110) |
| MFP101_1112 | Document B | DEC. 1, 2019, 2:02 P.M. | UserA | BW, Simplex, A4 | MFP 101 (LAN110) |
| MFP101_1113 | Document C | DEC. 1, 2019, 3:15 P.M. | UserB | Color, Simplex, A3 | MFP 101 (LAN110) |
| MFP101_1114 | Document D | DEC. 1, 2019, 4:00 P.M. | UserC | BW, Duplex, A4 | MFP 101 (LAN110) |
| MFP101_1115 | Document E | DEC. 1, 2019, 4:30 P.M. | UserB | Color, Simplex, A3 | MFP 101 (LAN110) |
| MFP101_1116 | Document F | DEC. 1, 2019, 4:42 P.M. | UserA | BW, Duplex, A4 | MFP 101 (LAN110) |
| MFP101_1117 | Document G | DEC. 1, 2019, 4:50 P.M. | UserA | Color, Simplex, A4 | MFP 101 (LAN110) |
| MFP101_1118 | Document H | DEC. 1, 2019, 5:00 P.M. | UserB | BW, Duplex, A4 | MFP 101 (LAN110) |

IMAGE FORMING APPARATUS, PRINTING SYSTEM, CONTROL METHOD, AND STORAGE MEDIUM

BACKGROUND

Field of the Disclosure

The present disclosure relates to an image forming apparatus that performs communication via a secure first network and communication via a second network, a printing system, a control method, and a storage medium.

Description of the Related Art

"Reservation printing" has conventionally been implemented in image forming apparatuses installed in offices. In reservation printing, a document print instruction is issued from an information processing apparatus such as a personal computer (PC), a document output instruction is issued from the operation unit on an image forming apparatus, and then a document is printed. A reservation printing function makes it possible to prevent an output document from being acquired or read by other users.

In remote printing that has been widely used in recent years, print data is printed by an image forming apparatus (output device) different from an image forming apparatus (input device) in which print data is reserved. In remote printing, the image forming apparatus as an input device transmits bibliographic information for received print data to a server that manages bibliographic information such as document names of print data. When the user logs into the image forming apparatus as an output device, the output device acquires a list of print data related to the user from the server. The image forming apparatus as an output device receives an instruction for printing print data selected from the list and then prints the print data.

In recent years, a certain image forming apparatus is capable of connecting to a plurality of networks. When using an image forming apparatus that can connect to only one network in an environment including a plurality of networks, it is necessary to install a plurality of the image forming apparatuses corresponding to the number of networks. On the other hand, when using an image forming apparatus that can connect to a plurality of networks, the plurality of networks shares the image forming apparatus, making it possible to restrain the number of image forming apparatuses to be installed. Generally, when using two different networks, one network is made connectable to the Internet and the other network is not made connectable to the Internet. In this case, the latter network is used for operations handling secure documents.

Japanese Patent Application Laid-Open No. 2019-126988 discusses an image forming apparatus that is connected to a network A, such as a Local Area Network (LAN), of a system A, and a network B of a system B. An operation terminal connected to the network A transmits a print request including data to be printed, the document name of the data to be printed, and print setting information to a print server 30a connected to the network A. Then, the print server 30a stores the received print request. Likewise, a guest terminal connected to the network B transmits a print request to a print server 30b connected to the network B. Then, the print server 30b stores the received print request. The image forming apparatus determines the network associated with a login user and requests a job list from the print server connected to the network.

In the above-described remote printing, the terminal apparatus transmits print data to the image forming apparatus as an input device, and the image forming apparatus transmits information for the received print data to the server that manages the information. A case where the image forming apparatus as an input device is connectable to two different networks is assumed. In this case, information for print data received from a terminal apparatus connected to a first network may possibly be transmitted to the server connected to a second network different from the first network. Particularly when the first network is a secure network, the information for the print data received via the first network may leak out of the first network, making it impossible to maintain security in the first network.

SUMMARY

According to embodiments of the present disclosure, a printing apparatus configured to perform communication via a secure first network and communication via a second network, the printing apparatus includes one or more memories, and one or more processors that execute a set of instructions to receive print data from a first terminal apparatus connected to the first network, via the first network, or from a second terminal apparatus connected to the second network, via the second network, and transmit information for the print data to at least either one of a first server that performs communication via the first network and a second server that performs communication via the second network, based on through which of the first and the second networks the print data has been received, wherein, in a case where the print data is received via the first network, the information for the print data is transmitted to the first server via the first network, without via the second network.

Further features of the present disclosure will become apparent from the following description of exemplary embodiments with reference to the attached drawings.

BRIEF DESCRIPTION OF THE DRAWINGS

FIG. 1 illustrates a configuration of a printing system according to a first exemplary embodiment of the present disclosure.

FIG. 2 illustrates a hardware configuration of a multi-function peripheral (MFP).

FIG. 4 illustrates software configurations of an MFP 101 and a bibliographic information management server 107.

FIG. 5 illustrates the contents of bibliographic information for a job.

FIG. 6 illustrates an example of a bibliographic information management table 403 managed by the bibliographic information management servers.

FIG. 7 illustrates examples of user interfaces (UIs) displayed on an operation unit 220 of an MFP.

FIG. 12 illustrates examples of bibliographic information according to a second exemplary embodiment.

FIG. 13 illustrates examples of bibliographic information management tables managed by the bibliographic information management servers according to the second exemplary embodiment.

DESCRIPTION OF THE EMBODIMENTS

Figure 3A:
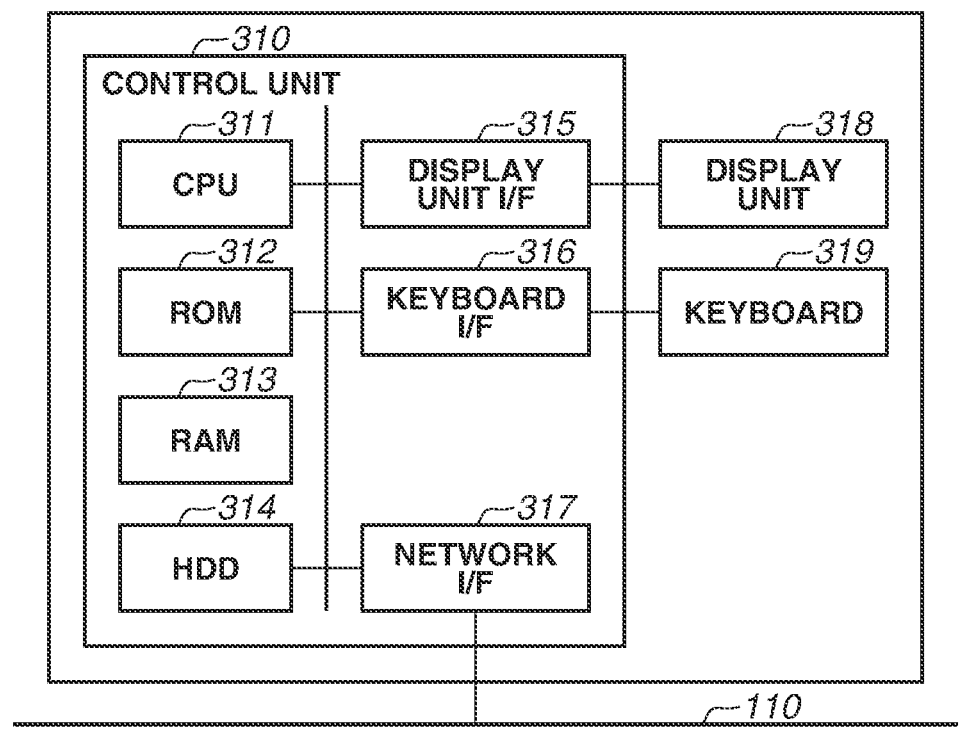
FIGS. 3A and 3B illustrate hardware configurations of a personal computer (PC) and a bibliographic information management server, respectively.

Embodiments for implementing the present disclosure will be described below with reference to the accompanying drawings.

First Exemplary Embodiment

<Configuration of Printing System>

FIG. 1 illustrates a configuration of a printing system according to a first exemplary embodiment of the present disclosure.

In this system, a Local Area Network (LAN) 110 is connected with a multifunction peripheral (MFP) 101, a personal computer (PC) 102, a bibliographic information management server 103, and an MFP 104, and a LAN 120 is connected with the MFP 101, an MFP 105, and a PC 106. The MFPs 101 and 105 and the PC 106 can communicate with the bibliographic information management server 107 that is connected to a Wide Area Network (WAN) 130 as the Internet via the LAN 120. The MFP 101 is connected to the two different LANs: the LANs 110 and 120. The apparatuses on the same LAN can communicate with each other. The apparatuses on the LAN 120 can communicate with the bibliographic information management server 107 via the WAN 130.

The MFPs 101, 104, and 105 are image forming apparatuses having a scanner and a printer. The PCs 102 and 106 are used to perform setting and printing on the MFP on each LAN.

The bibliographic information management servers 103 and 107 manage bibliographic information transmitted from the MFP 101.

<Hardware Configuration of MFP>

FIG. 2 illustrates a hardware configuration of an MFP according to the first exemplary embodiment of the present disclosure.

A control unit 210 including a central processing unit (CPU) 211 controls the operation of the entire MFP. The CPU 211 reads a control program stored in a read only memory (ROM) 212 or a hard disk drive (HDD) 214 and executes various kinds of control processing such as read control and transmission control. A random access memory (RAM) 213 is used as the main memory of the CPU 211 and a temporary storage area such as a work area. The HDD 214 stores image data, print control programs, and job data.

An operation unit interface (I/F) 215 connects between the operation unit 220 and the control unit 210. The operation unit 220 is provided with a liquid crystal display (LCD) having a touch panel function, and a keyboard.

A printer I/F 216 connects between a printer 221 and the control unit 210. Job data to be printed by the printer 221 is transferred from the control unit 210 to the printer 221 via the printer I/F 216 and then printed on a recording medium by the printer 221.

A scanner I/F 217 connects between a scanner 222 and the control unit 210. The scanner 222 reads an image on a document to generate image data and inputs the image data to the control unit 210 via the scanner I/F 217. The MFP includes two different network I/Fs: a network I/F 1 and a network I/F 2. A network I/F 1 218 connects with the LAN 110. The network I/F 1 218 transmits and receives various kinds of information to/from other apparatuses on the LAN 110. A network I/F 2 219 connects to the LAN 120. The network I/F 2 219 transmits and receives various kinds of information to/from other apparatuses on the LAN 120 or the WAN 130. Either one of the network I/F 1 218 and the network I/F 2 219 may not be built in the MFP but may be external to the MFP.

<Hardware Configurations of PC and Bibliographic Information Management Server>

Figure 3B:
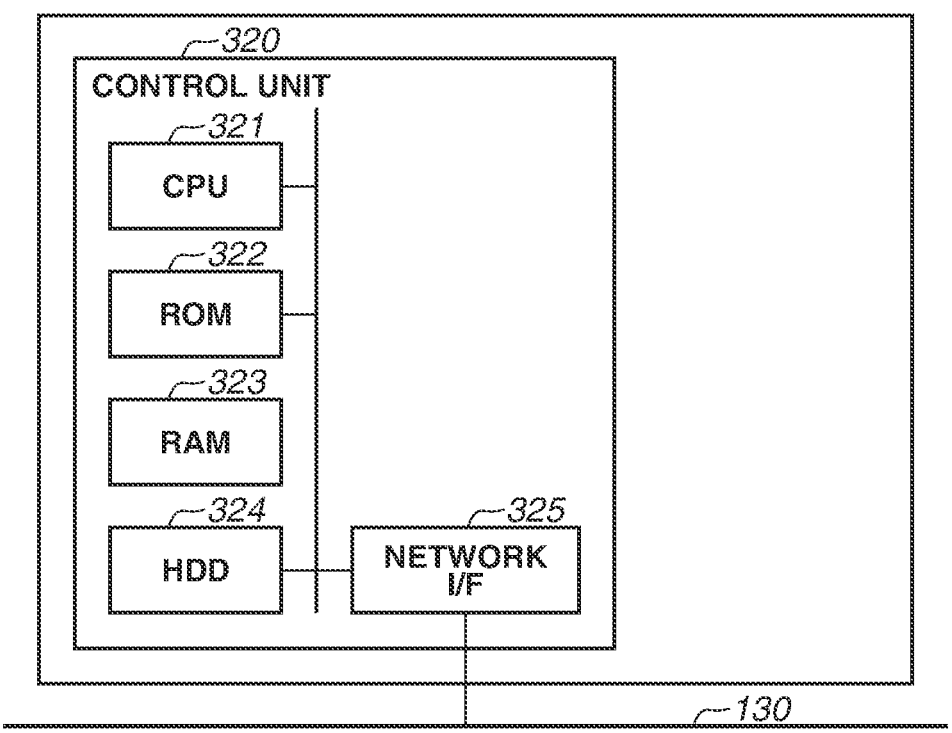

FIGS. 3A and 3B illustrate hardware configurations of a PC and a bibliographic information management server according to the first exemplary embodiment of the present disclosure.

FIG. 3A illustrates a hardware configuration of the PC. A control unit 310 including a CPU 311 controls the operation of the entire PC. The CPU 311 reads a control program stored in a ROM 312 or an HDD 314 and performs various kinds of control processing. A RAM 313 is used as the main memory of the CPU 311 and a temporary storage area such as a work area. The HDD 314 is a storage device for storing various programs and data.

A display unit I/F 315 connects between a display unit 318 and the control unit 310. A keyboard I/F 316 connects between a keyboard 319 and the control unit 310. The CPU 311 recognizes an instruction from the user via the keyboard 319, and changes the screen display on the display unit 318 in response to the recognized instruction.

A network I/F 317 transmits and receives various kinds of information to/from other apparatuses on the LAN 110 or 120.

FIG. 3B illustrates a hardware configuration of a bibliographic information management server.

A control unit 320 including a CPU 321 controls the operation of the entire bibliographic information management server. The CPU 321 reads a control program stored in a ROM 322 or an HDD 324 and performs various kinds of control processing. A RAM 323 is used as the main memory of the CPU 321 and a temporary storage area such as a work area. The HDD 324 stores various programs and data. According to the present exemplary embodiment, data in the bibliographic information management table managed by the bibliographic information management server is stored in the HDD 324.

A network I/F 325 connects the control unit 320 to the LAN 110 or the WAN 130. The network I/F 325 transmits and receives various kinds of information to/from other apparatuses connected via the LAN 110 or the WAN 130.

<Software Configurations of the MFP 101 and Bibliographic Information Management Server 107>

FIG. 4 illustrates software configurations of the MFP 101 and the bibliographic information management server 107 according to the first exemplary embodiment of the present disclosure.

A bibliographic information management unit 401 includes a bibliographic information management table 403 for managing the bibliographic information, and a bibliographic information control unit 402 for controlling the bibliographic information.

A reception/transmission control unit 404 controls reception and transmission of the bibliographic information, and receives the bibliographic information transmitted from the MFP 101 via the network I/F 325. The reception/transmission control unit 404 transmits the bibliographic information in response to a bibliographic information acquisition request transmitted from the MFP subjected to job output via the network I/F 325.

An input service 410 includes a job reception unit 414 for receiving a job from a PC, a job storage unit 411 for storing the job in the HDD 214, and a bibliographic information generation unit 412 for generating the bibliographic information for the job stored in the job storage unit 411. The input service 410 further includes a bibliographic information transmission unit 413 for transmitting the generated bibliographic information to a bibliographic information server via a network I/F.

A job transmission service 420 includes a job transmission request reception unit 421 for receiving a job transmission request from an MFP, and a job transmission unit 422 for transmitting a job to the MFP.

An output service 430 acquires a bibliographic information list, receives an output instruction from the user, and controls output.

A job list control unit 431 acquires bibliographic information from a bibliographic information management server and displays bibliographic information on the operation unit 220.

An output job identification unit 432 receives an output job instruction from the user and identifies the job to be output.

An input device identification unit 433 identifies which MFP stores the job to be output, based on bibliographic information.

A job transmission request transmission unit 434 transmits a job transmission request to the job transmission service 420 of the MFP storing the job to be output.

A job reception unit 435 receives a job transmitted from the job transmission unit 422 of the job transmission service 420 of the MFP storing the job to be output.

A job output unit 436 outputs the job received by the job reception unit 435 via a print control unit 450.

A network control unit 440 controls communication with other apparatuses via a network I/F and each LAN.

An authentication control unit 460 displays a user authentication screen via the operation unit 220, receives authentication information from the user, and performs authentication processing to identify the user.

FIG. 4 illustrates the software configuration of the bibliographic information management server 107. The bibliographic information management server 103 has a similar software configuration to the bibliographic information management server 107. However, the bibliographic information management server 103 is different from the bibliographic information management server 107 in being connected to the LAN 110 instead of the WAN 130.

The MFPs 104 and 105 have a similar software configuration to the MFP 101.

However, the MFP 101 is connected to two different LANs while the MFPs 104 and 105 are each connected to either one of the two LANs.

Like the MFP 101, the MFPs 104 and 105 can receive a job input from a PC. The present exemplary embodiment will be described below centering on job inputting to the MFP connected to the two LANs, and the description of job inputting to the MFPs 104 and 105 will be omitted.

The present exemplary embodiment will be described below on the premise that the MFP subjected to job output is the MFP 105, and the MFP subjected to job inputting is the MFP 101.

<Bibliographic Information for Job>

FIG. 5 illustrates the contents of the bibliography information for a job according to the first exemplary embodiment of the present disclosure.

FIG. 5 illustrates an example of the bibliographic information generated when User A inputs a job to the MFP 101 via the PC 106.

Job ID is a unique identifier (ID) for identifying a job. A job input to the MFP 101 is assigned a unique number and given an ID "MFP101_1111". When a new job is input, the ID is incremented to MFP101_1112. The ID may also be a random number or other formats as long as it is a unique identifier.

Document Name indicates the document name.

Submit Date indicates the date and time when the job has been input.

User Name indicates the user from which the job has been s input.

Job Setting indicates print settings for the job.

Job Holder indicates the apparatus that stores the job. According to the present exemplary embodiment, since the job is stored in the MFP 101, information about the MFP 101 is stored as Job Holder.

The MFP subjected to job output identifies the MFP storing the job based on the bibliographic information.

According to the present exemplary embodiment, the device name of the MFP 101 is used as Job Holder. However, Job Holder only needs to be information that enables the MFP 105 to identify the MFP 101, such as the Internet Protocol (IP) address or Fully Qualified Domain Name (FQDN).

<Bibliographic Information Management Table>

FIG. 6 illustrates an example of a bibliographic information management table 403 managed by the bibliographic information management servers according to the first exemplary embodiment of the present disclosure.

FIG. 6 illustrates an example of a bibliographic information management table 600 managed by the bibliographic information management server 107, and an example of a bibliographic information management table 610 managed by the bibliographic information management server 103.

In the table 600, each row is expressed as one job.

ID 601 stores Job ID for the bibliographic information.

Document Name 602 stores Document Name of the bibliographic information.

Submit Date 603 stores Submit Date of the bibliographic information.

User Name 604 stores User Name of the bibliographic information.

Job Setting 605 stores Job Setting of the bibliographic information.

Job Holder 606 stores Job Holder of the bibliographic information.

Thus, the contents of the bibliography information are stored in the bibliographic information management tables 600 and 610. The bibliographic information management table 610 including columns 611 to 616 has similar row and column configurations to the bibliographic information management table 600, and redundant descriptions thereof will be omitted.

According to the present exemplary embodiment, a total of four different pieces of bibliographic information are registered in the bibliographic information management table 600. Of the bibliographic information registered in the bibliographic information management table 600, two jobs MFP101_1111 and MFP101_1112 are registered as jobs of User A.

FIG. 7 illustrates examples of user interfaces (UIs) displayed on the operation unit 220 of an MFP according to the first exemplary embodiment of the present disclosure.

The present exemplary embodiment will be described below centering on an example where the MFP 105 is used as an output device.

FIG. 7 illustrates an authentication screen 700.

This screen is a UI for performing authentication to identify the user when using reservation printing.

The present exemplary embodiment is not characterized in a specific authentication method, and the detailed description of authentication will be omitted. Many examples of authentication methods include a method for providing an authentication table in the HDD 214, a method for performing authentication to an external server, a method for using a user ID and a password as input means, and a method for using authentication device such as an integrated circuit (IC) card.

The user ID is input via a text box 701, and the password is input via a text box 702. When the user presses a Log In button 703, the authentication control unit 460 performs authentication processing, and the user operating the MFP is identified.

An example of a job list UI 710 is displayed when User A logs into the MFP 105.

The MFP 105 acquires a list of bibliographic information for jobs of User A from the bibliographic information server 107 and then displays the list.

Referring to a table 711, one row is represented as a job.

"Selection" indicates whether the job is selected. When the black check mark indicates that the job is selected, and the white check mark indicates that the job is not selected.

"Document Name" indicates Document Name of the bibliographic information, "Date and Time of Registration" indicates Submit Date of the bibliographic information, and "Settings" indicates information for Job Setting of the bibliographic information.

A Delete button 712 and a Print button 713 are used to delete and print a selected job, respectively.

Figure 8:
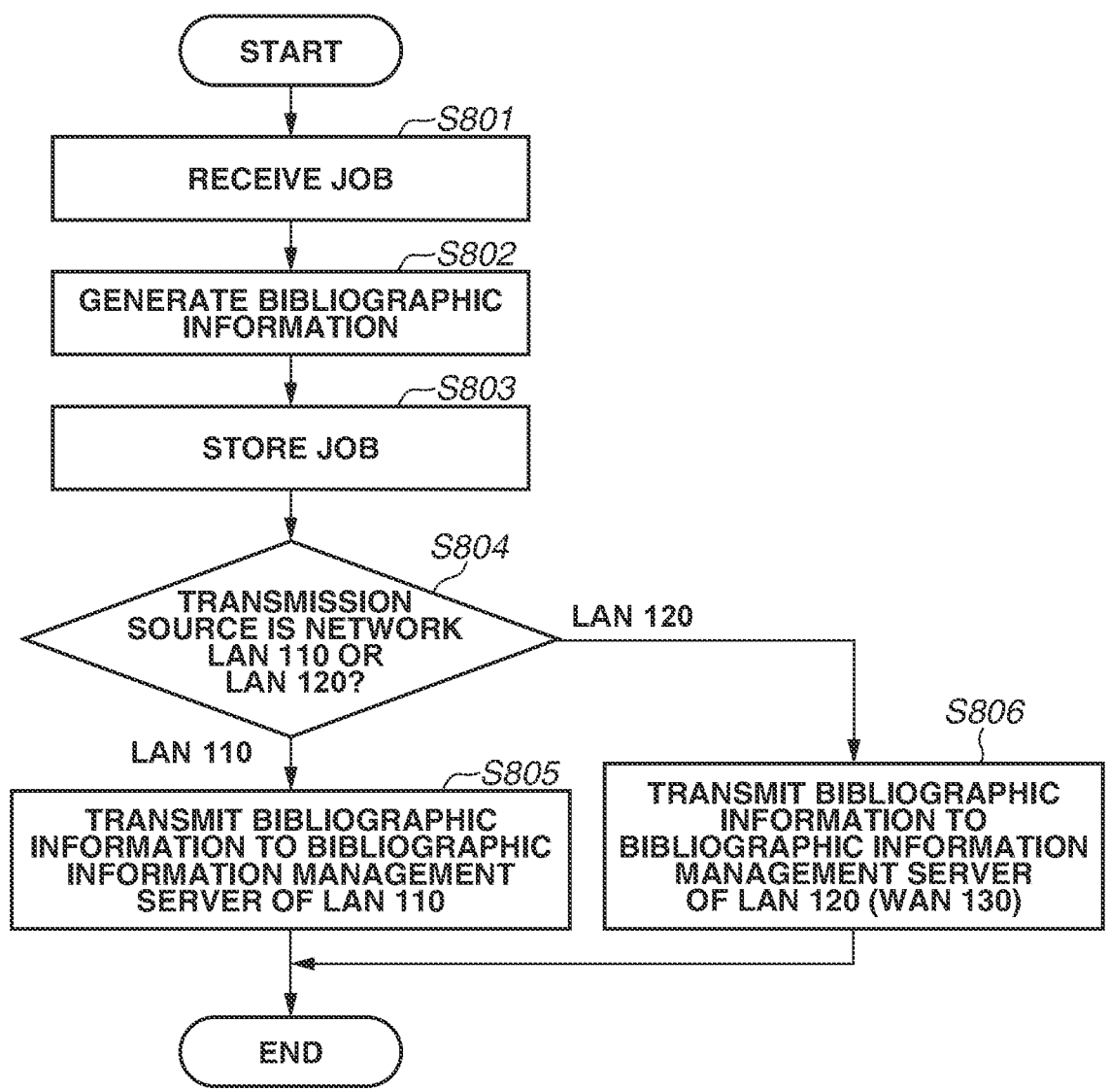
FIG. 8 is a flowchart illustrating a series of processing since the MFP 101 receives a job until the MFP 101 transmits the bibliographic information to a bibliographic information management server according to the first exemplary embodiment.

FIG. 8 is a flowchart illustrating a series of processing since the MFP 101 receives a job until the MFP 101 transmits the bibliographic information to a bibliographic information management server according to the first exemplary embodiment of the present disclosure. This flowchart is started when the MFP 101 receives a job from a PC via a network I/F.

In step S801, the MFP 101 receives a job. More specifically, the job reception unit 414 of the input service 410 of the MFP 101 receives a job from the PC via the network I/F 1 or the network I/F 2.

In step S802, the MFP 101 generates bibliographic information. More specifically, the job received in step S801 is analyzed by the bibliographic information generation unit 412, and the bibliographic information illustrated in FIG. 5 is generated.

The bibliographic information generation unit 412 analyzes through which of the network I/Fs 1 and 2 the job reception unit 414 has received the job, and stores Job Holder information corresponding to the network I/F used for reception, in the bibliographic information.

The MFP subjected to job output identifies the MFP storing the job based on the Job Holder information.

When Job Holder is represented by the IP address or FQDN, it is necessary to store information corresponding to the network I/F used for reception in Job Holder such that the MFP subjected to job output can perform identification. For example, when the MFP 101 receives a job from the PC 106, the job is received by the network I/F 2 via the LAN 120. In this case, the Job Holder information to be recorded in Job Holder identifies the MFP 101 on the LAN 120. On the other hand, when the MFP 101 receives a job via the LAN 110, information for identifying the MFP 101 on the LAN 110 is recorded in Job Holder. When a unit for identifying the MFP 101 is separately provided on a network, for example, when another server for performing address resolution exists on a network, an identifier common to the LANs 110 and 120 may be used. When the IP address or FQDN is used, the value thereof differs according to the network I/F and therefore a different value corresponding to each network is stored.

In step S803, the MFP 101 stores the job. More specifically, the job storage unit 411 stores the received job in the HDD 214.

In step S804, the MFP 101 determines the transmission source network. More specifically, the bibliographic information transmission unit 413 determines through which of the network I/Fs 1 and 2 the job reception unit 414 has received the job.

In step S805, the MFP 101 transmits the bibliographic information to the bibliographic information management server 103 on the LAN 110. More specifically, when the MFP 101 determines that the network I/F 1 has received the job, i.e., the job has been transmitted from the PC 102 on the LAN 110 (YES in step S804), the processing proceeds to step S805. In step S805, the bibliographic information transmission unit 413 transmits the bibliographic information to the bibliographic information server 103 on the LAN 110.

In step S806, the MFP 101 transmits the bibliographic information to the bibliographic information management server 107 on the LAN 120 (WAN 130). More specifically, when the MFP 101 determines that the job has been transmitted from the PC 106 on the LAN 120 (NO in step S804), the processing proceeds to step S806. In step S806, the bibliographic information transmission unit 413 transmits the bibliographic information to the bibliographic information server 107 on the LAN 120.

The processing exits this flowchart when the transmission of the bibliographic information for the received job is completed in step S805 or S806. Although, in step S805 or S806, the bibliographic information for the job is transmitted, the entity of the print data included in the job or information related to the job may be transmitted as job information.

Figure 9:
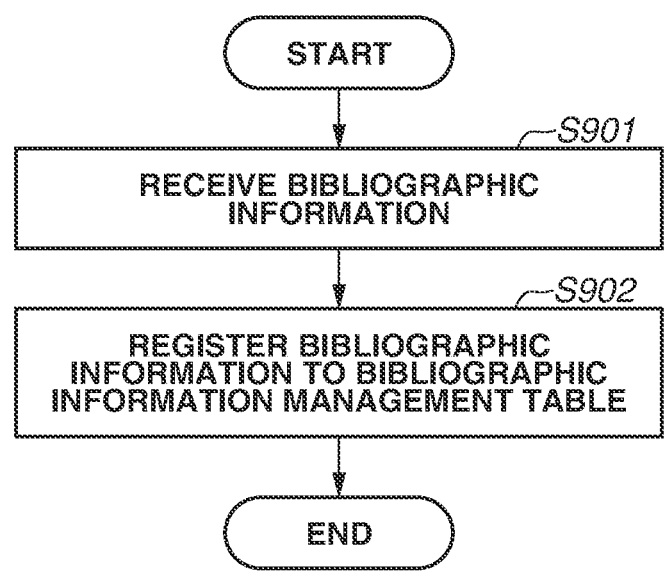
FIG. 9 is a flowchart illustrating a series of processing since a bibliographic information management server receives bibliographic information until the server registers the bibliographic information in the bibliographic information management table 403 according to the first exemplary embodiment.

FIG. 9 is a flowchart illustrating a series of processing since a bibliographic information management server receives the bibliographic information until the server registers the bibliographic information to the bibliographic information management table 403 according to the first exemplary embodiment of the present disclosure. This flowchart is started when the MFP 101 completes a series of processing illustrated in FIG. 8 (from job reception to bibliographic information transmission) and then the bibliographic information management server receives the bibliographic information via the network I/F 325.

An example of processing since the bibliographic information management server 107 receives the bibliographic information from the MFP 101 until the server registers the information will be described below.

In step S901, the bibliographic information management server 107 receives bibliographic information. More specifically, the reception/transmission control unit 404 of the bibliographic information management server 107 receives the bibliographic information from the MFP 101 via the WAN 130.

In step S902, the bibliographic information management server 107 registers the bibliographic information to the bibliographic information management table 403. More specifically, the bibliographic information control unit 402 of the bibliographic information management unit 401 registers the bibliographic information received in step S901 to the bibliographic information management table 403.

The processing exits this flowchart when the registration of the bibliographic information in step S902 is completed.

For example, when the bibliographic information management server 107 receives the bibliographic information illustrated in FIG. 5, information MFP101_1111 in the bibliographic information management table 600 illustrated in FIG. 6 is registered in the bibliographic information management table 403 in steps S901 and S902.

The bibliographic information management server 103 receives the bibliographic information and registers the bibliographic information to the bibliographic information management table 403 in similar steps to the bibliographic information management server 107. The bibliographic information management server 103 is connected to a network different from the network to which the bibliographic information management server 107 is connected.

Figure 10:
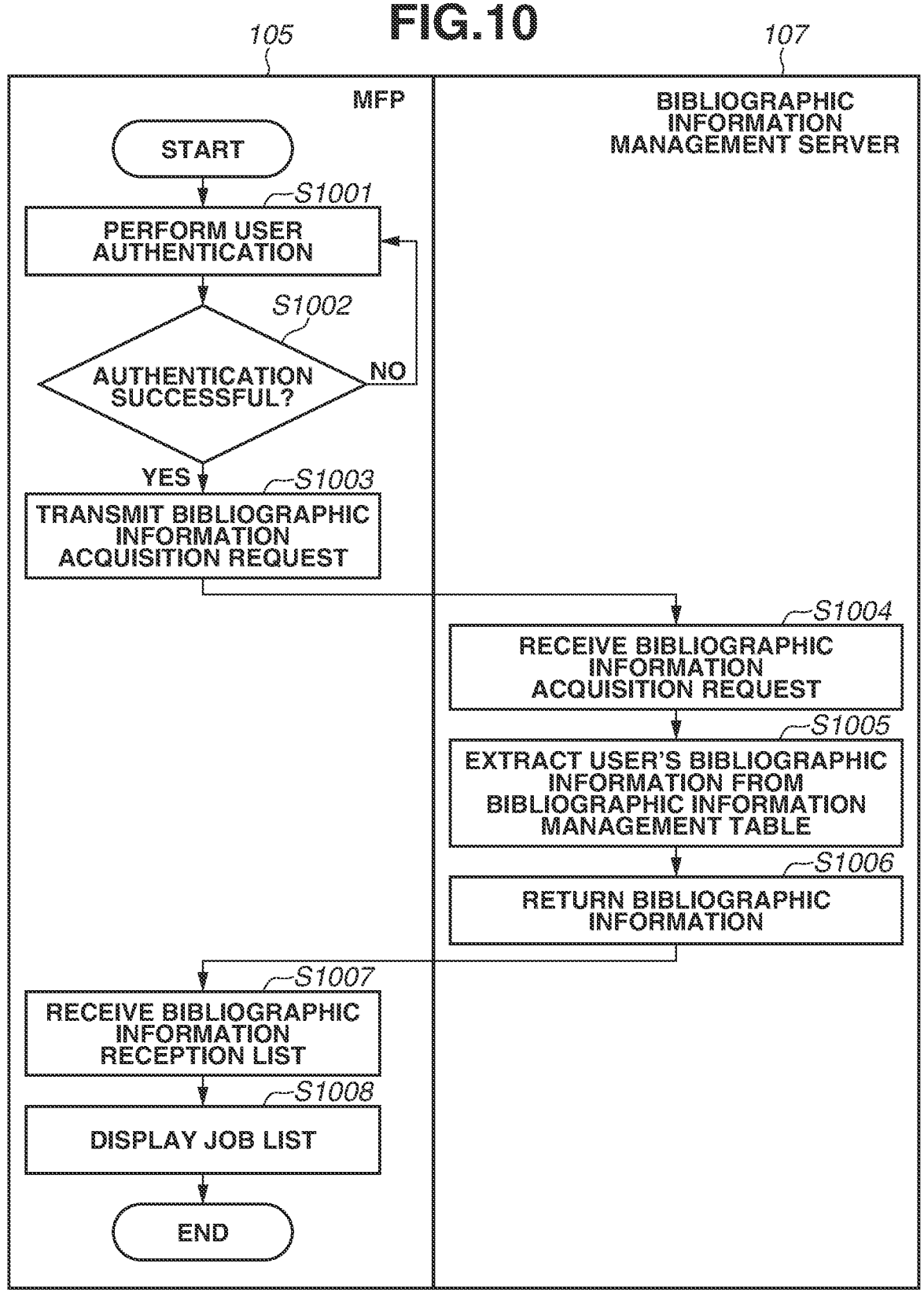
FIG. 10 is a flowchart illustrating a series of processing performed by an MFP 105 to display a job list for enabling the user to perform reservation printing on the MFP 105, on an operation unit 220 of the MFP 105, according to the first exemplary embodiment.

FIG. 10 is a flowchart illustrating a series of processing in which the MFP 105 displays a job list for enabling the user to perform reservation printing on the MFP 105 on the operation unit 220 of the MFP 105 according to the first exemplary embodiment of the present disclosure.

Processing in steps S1001 to S1003, S1007, and S1008 is performed by the MFP 105.

In step S1001, the MFP 105 performs user authentication. More specifically, in performing reservation printing, the MFP 105 displays a job list associated with the user on the operation unit 220. To identify jobs associated with the user, the MFP 105 identifies the user operating the MFP 105.

The authentication control unit 460 of the MFP 105 displays an authentication screen 700 illustrated in FIG. 7 on the operation unit 220.

The MFP 105 receives a user ID and a password from the user via the authentication screen. When the user presses a Log In button 703, the authentication processing is performed. The present exemplary embodiment is not characterized in a specific authentication method, and the detailed description of authentication will be omitted.

In step S1002, the MFP 105 determines whether the user authentication is successful. More specifically, when the MFP 105 determines that the user authentication is successful (YES in step S1002), the processing proceeds to step S1003. On the other hand, when the MFP 105 determines that the user authentication fails (NO in step S1002), the processing returns to step S1001. In step S1001, the MFP 105 receives an input of authentication information from the user. According to the present exemplary embodiment, User A is authenticated.

In step S1003, the MFP 105 transmits a bibliographic information acquisition request. More specifically, according to the present exemplary embodiment, the MFP 105 makes an inquiry about the bibliographic information to the bibliographic information management server on the same network as the LAN connected with the MFP 105. Therefore, the MFP 105 transmits, via the LAN 120, a bibliographic information acquisition request to the bibliographic information management server 107 connected to the WAN 130. To acquire the bibliographic information associated with User A as the user authenticated in step S1001, the job list control unit 431 transmits, via the LAN 120, a bibliographic information acquisition request to the bibliographic information management server 107 connected to the WAN 130.

Processing in steps S1004 to S1006 is performed by the bibliographic information management server 107.

In step S1004, the bibliographic information management server 107 receives the bibliographic information acquisition request. More specifically, the reception/transmission control unit 404 of the bibliographic information management server 107 receives the bibliographic information acquisition request transmitted from the MFP 105 in step S1003.

In step S1005, the bibliographic information management server 107 extracts the user's bibliographic information from the bibliographic information management table 403. More specifically, the bibliographic information control unit 402 of the bibliographic information management unit 401 extracts the bibliographic information corresponding to the user's identifier from the bibliographic information registered in the bibliographic information management table 403, based on User Name as the user's identifier included in the bibliographic information acquisition request. According to the present exemplary embodiments, the contents of the bibliographic information management table 600 illustrated in FIG. 6 are managed by the bibliographic information management server 107. The bibliographic information management server 107 extracts jobs with which User A is registered as User Name in the table 600. As a result, two jobs having IDs MFP101_1111 and MFP101_1112 are extracted as jobs of User A.

In step S1006, the bibliographic information management server 107 returns the bibliographic information. More specifically, the bibliographic information control unit 402 instructs the reception/transmission control unit 404 to transmit the bibliographic information extracted in step S1005 to the MFP 105, and the reception/transmission control unit 404 transmits the bibliographic information to the MFP 105.

In step S1007, the MFP 105 receives the bibliographic information. More specifically, the job list control unit 431 of the MFP 105 receives the bibliographic information via the network control unit 440.

In step S1008, the MFP 105 displays a job list. More specifically, the job list control unit 431 analyzes the bibliographic information received in step S1007, and displays the job list UI 710 illustrated in FIG. 7 on the operation unit 220. According to the present exemplary embodiment, the two jobs extracted in step S1005 are displayed in list form. The processing exits this flowchart when the job list display is completed.

Figure 11:
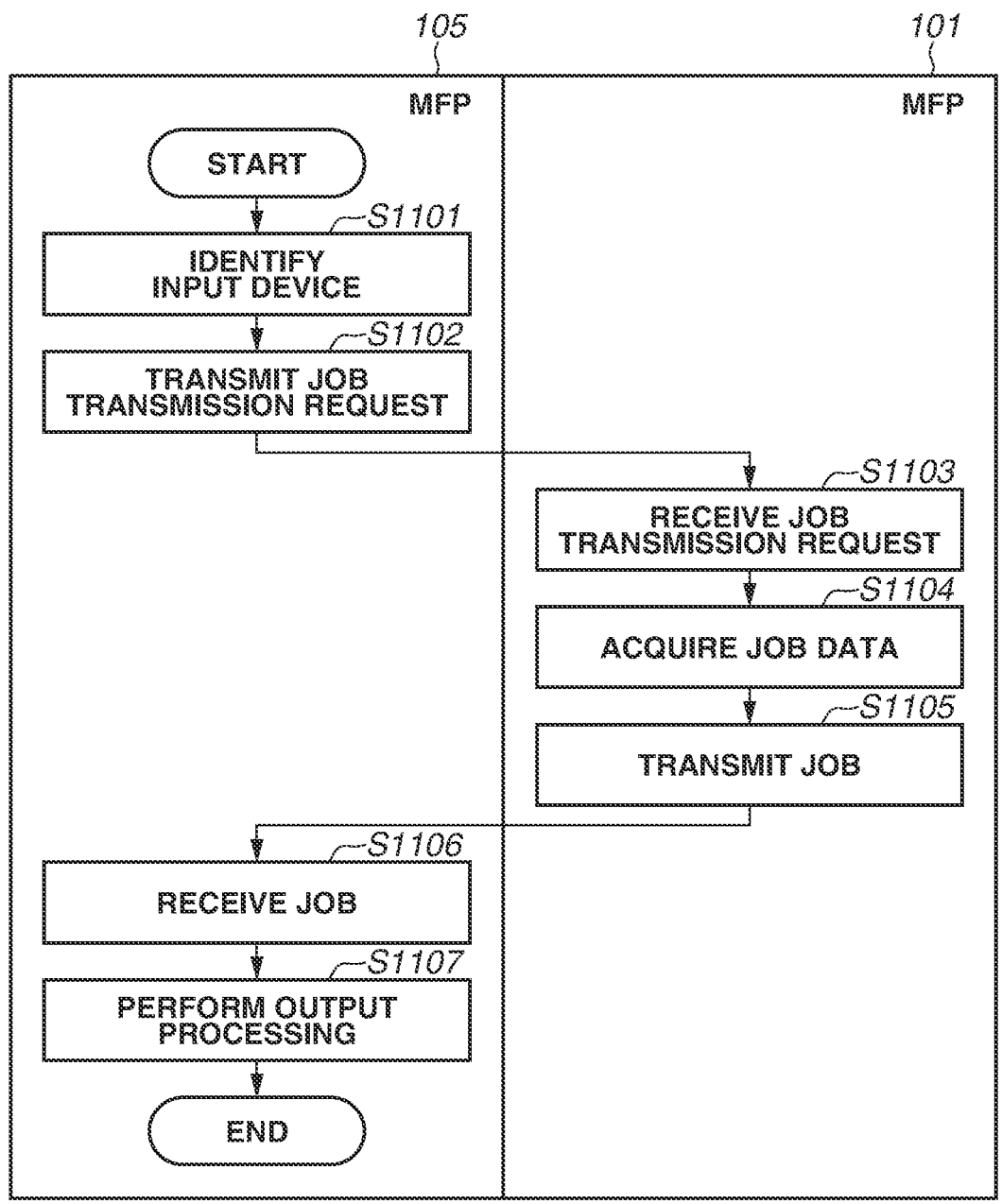
FIG. 11 is a flowchart illustrating a series of processing for performing print processing for reservation printing from the MFP 105, according to the first exemplary embodiment.

FIG. 11 is a flowchart illustrating a series of processing for performing print processing for reservation printing from the MFP 105 according to the first exemplary embodiment of the present disclosure.

This flowchart is started when the processing for displaying a job list illustrated in FIG. 10 is completed, and then the user selects a job from the job list screen (job list UI) 710 displayed on the operation unit 220 and presses the Print button 713.

Processing in steps S1101, 1102, S1106, and S1107 is performed by the MFP 105.

Processing in steps S1103 to S1105 is performed by the MFP 101.

In step S1101, the MFP 105 identifies an input device. More specifically, the output job identification unit 432 of the output service 430 receives a print instruction and identifies which job in the job list is selected as the printing target by the user. The job list UI 710 illustrated in FIG. 7 identifies that Document A out of two jobs (Document A and Document B) is selected.

In step S1102, the MFP 105 transmits a job transmission request. More specifically, the input device identification unit 433 of the output job service 430 identifies the input device based on the bibliographic information for the selected job. The bibliographic information for Document A is illustrated in FIG. 5. Job Holder illustrated in FIG. 5 identifies that the MFP 101 is an input device. The job transmission request transmission unit 434 of the output service 430 transmits to the MFP 101 a job transmission request for transmitting a job to the MFP 105.

In step S1103, the MFP 101 receives the job transmission request. More specifically, the job transmission request reception unit 421 of the job transmission service 420 of the MFP 101 receives the job transmission request transmitted from the MFP 105 in step S1102.

In step S1104, the MFP 101 acquire job data. More specifically, the job transmission service 420 acquires the job MFP101_1111 stored in the HDD 214.

In step S1105, the MFP 101 transmits the job. More specifically, the job transmission unit 422 transmits the job data acquired in step S1104 to the MFP 105 as the request source.

In step S1106, the MFP 105 receives the job. More specifically, the job reception unit 435 of the output service 430 of the MFP 105 receives the job data transmitted from the MFP 101 in step S1105.

In step S1107, the MFP 105 perform output processing. More specifically, the job output unit 436 of the MFP 105 outputs the job data received in step S1106, via the print control unit 450. The print control unit 450 performs the job output processing via the printer I/F 216 and the printer 221. The processing exits this flowchart upon completion of the job output processing.

As described above, according to the present exemplary embodiment, the MFP 101 connected to a plurality of networks transmits the bibliographic information for the print data received from the PC 102 connected to the LAN 110, to the bibliographic information management server 103 connected to the LAN 110. The MFP 101 also transmits the bibliographic information for the print data received from the PC 106 connected to the LAN 120, to the bibliographic information management server 107 connected to the LAN 120. The MFP 101 connected to a plurality of networks does not transmit the bibliographic information for the print data received from the PC 102 connected to the LAN 110, to the bibliographic information management server 107 connected to the LAN 120. This enables preventing the bibliographic information for the print data received via the LAN 110 not connected to the Internet, from being transmitted to the bibliographic information management server 107 connected to the LAN 120 connected to the Internet.

Second Exemplary Embodiment

A second exemplary embodiment of the present disclosure will be described below.

According to the first exemplary embodiment, the MFP 101 transmits the bibliographic information for the print data received from the PC 106 connected to the LAN 120, only to the bibliographic information management server 107 connected to the LAN 120. However, a case is assumed where the user also wants to print the print data received from the PC 106 connected to the LAN 120, in the image forming apparatus connected only to the LAN 110.

According to the second exemplary embodiment, the MFP 101 stores information about the bibliographic information transmission setting in the HDD 214. The bibliographic information transmission setting refers to a setting about whether to transmit the bibliographic information for an input job to a bibliographic information management server on each network, or only to the bibliographic information management server connected to a network that is the same as the network from which the job has been input.

According to the present exemplary embodiment, the bibliographic information for the job transmitted from the LAN 110 is transmitted to the bibliographic information management server 103 on the LAN 110. Further, a setting for transmitting the bibliographic information for the job transmitted from the LAN 120 to the bibliographic information management servers 103 and 107 connected to the LANs 110 and 120, respectively, is assumed to be preset as the bibliographic information transmission setting. The descriptions of the setting value format and the setting method will be omitted.

The system configuration, the hardware configurations of the MFPs, the hardware configurations of the PCs and the bibliographic information management servers, and the software configurations of the MFP 101 and the bibliographic information management server 107 illustrated in FIGS. 1 to 4 are similar to those according to the first exemplary embodiment.

FIG. 12 illustrates examples of bibliographic information according to the second exemplary embodiment of the present disclosure.

FIG. 12 illustrates two different pieces of bibliographic information 1201 and 1202 for the same job.

The bibliographic information 1201 is transmitted to the bibliographic information management server 107 on the LAN 120, and the bibliographic information 1202 is transmitted to the bibliographic information management server 103 on the LAN 110.

The two pieces of information 1201 and 1202 store the same contents except for Job Holder. For Job Holder, information for identifying the MFP 101 on the LAN 120 is stored in the bibliographic information 1201, and information for identifying the MFP 101 on the LAN 110 is stored in the bibliographic information 1202.

FIG. 13 illustrates specific examples of bibliographic information management tables managed by the bibliographic information management servers according to the second exemplary embodiment of the present disclosure.

FIG. 13 illustrates an example of a bibliographic information management table 1300 managed by the bibliographic information management server 107.

FIG. 13 illustrates an example of a bibliographic information management table 1310 managed by the bibliographic information management server 103.

According to the second exemplary embodiment, jobs with IDs MFP101_1111, MFP101_1112, MFP101_1113, and MFP101_1118 are managed by the bibliographic information management servers 103 and 107.

On the other hand, jobs with IDs MFP101_1114 to MFP101_1117 are managed only by the bibliographic information management server 103. The examples indicate that the bibliographic information registered in the bibliographic information management server 107 is also registered in the bibliographic information server 103.

Figure 14:
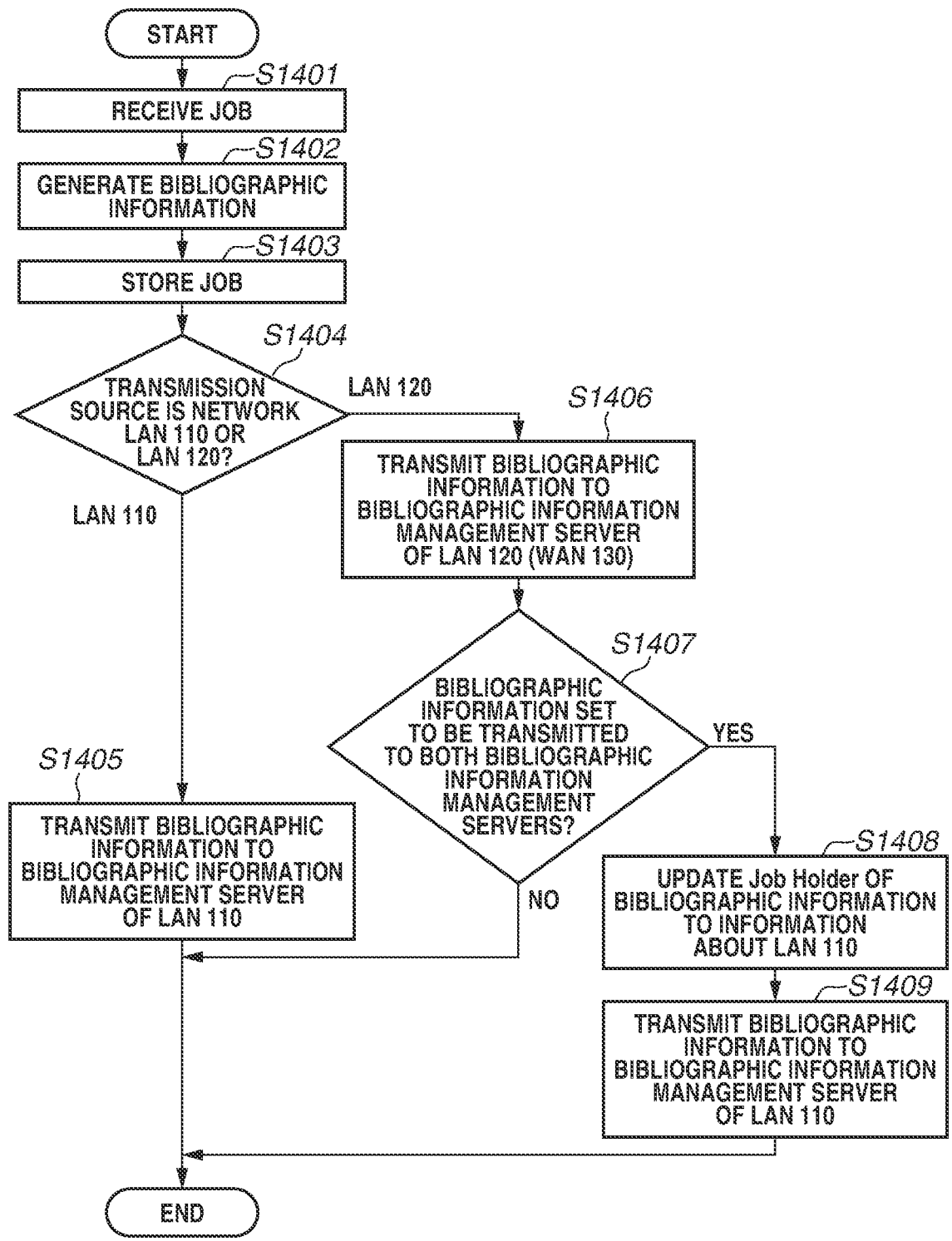
FIG. 14 is a flowchart illustrating a series of processing performed by the MFP 101 to receive a job according to the second exemplary embodiment.

FIG. 14 is a flowchart illustrating a series of job reception processing performed by the MFP 101 according to the second exemplary embodiment of the present disclosure.

This flowchart is started when the MFP 101 receives a job from a PC via a network I/F.

In step S1401, the MFP 101 receives a job. More specifically, the job reception unit 414 of the input service 410 of the MFP 101 receives a job from a PC via the network I/F 1 or 2.

In step S1402, the MFP 101 generates bibliographic information. More specifically, the bibliographic information generation unit 412 analyzes the job received in step S1401 and generates the bibliographic information 1201 illustrated in FIG. 12. The bibliographic information generation unit 412 analyzes through which of the network I/Fs 1 and 2 the job reception unit 414 has received the job, and stores the Job Holder information corresponding to the network I/F used for reception in the bibliographic information.

The MFP subjected to job output identifies the MFP that stores the job, based on the Job Holder information.

When Job Holder is represented by the IP address or FQDN, it is necessary to store information corresponding to the network I/F used for reception in Job Holder such that the MFP subjected to job output can perform identification. For example, when the MFP 101 receives a job from the PC 106, the job is received by the network I/F 2 via the LAN 120. In this case, the Job Holder information to be recorded in Job Holder serves as information for identifying the MFP 101 on the LAN 120, and the bibliographic information 1201 is generated. On the other hand, when the MFP 101 receives a job via the LAN 110, information for identifying the MFP 101 on the LAN 110 is recorded in Job Holder. When a unit for identifying the MFP 101 is separately provided on a network, for example, when another server for performing address resolution exists on a network, an identifier common to the LANs 110 and 120 may be used. When the IP address or FQDN is used, the value thereof differs according to the network I/F and therefore a different value corresponding to each network is stored.

In step S1403, the MFP 101 stores the job. More specifically, the job storage unit 411 stores the received job in the HDD 214.

In step S1404, the MFP 101 determines the transmission source network. More specifically, the bibliographic information transmission unit 413 determines through which of the network I/Fs 1 and 2 the job reception unit 414 has received the job.

In step S1405, the MFP 101 transmits the bibliographic information. More specifically, when the MFP 101 determines that the network I/F 1 has received the job, i.e., the job has been transmitted from the PC 102 on the LAN 110 (YES in step S1404), the processing proceeds to step S1405. In step S1405, the bibliographic information transmission unit 413 transmits the bibliographic information to the bibliographic information server 103 on the LAN 110.

In step S1406, the MFP 101 transmits the bibliographic information. More specifically, when the MFP 101 determines that the network I/F 2 has received the job, i.e., the job has been transmitted from the PC 106 on the LAN 120 (NO in step S1404), the processing proceeds to step S1406. In step S1406, the bibliographic information transmission unit 413 transmits the bibliographic information to the bibliographic information server 107 on the LAN 120.

In step S1407, the MFP 101 determines whether to transmit the bibliographic information to both bibliographic information management servers. More specifically, the input service 410 confirms the bibliographic information transmission setting stored in the HDD 214. With the bibliographic information transmission setting according to the present exemplary embodiment, the bibliographic information for a job transmitted from the LAN 120 is to be transmitted to the bibliographic information management servers on the LAN 110 and the LAN 120 (WAN 130). Therefore, the MFP 101 determines that the bibliographic information is to be transmitted to both bibliographic information management servers (YES in step S1407), and therefore the processing proceeds to step S1408. In step S1408, the MFP 101 updates the Job Holder information for the bibliographic information.

As another operation form, the bibliographic information transmission setting may be set to transmit the bibliographic information to the bibliographic information management server 107 on the LAN 120. In this case, the MFP 101 determines that the bibliographic information is not transmitted to both bibliographic information management servers (NO in step S1407). Then, the processing exits this flowchart.

In step S1408, the MFP 101 updates the Job Holder information for the bibliographic information. More specifically, the bibliographic information generation unit 412 updates the bibliographic information generated in step S1402. Job Holder stores information for identifying the MFP 101 on the LAN 120 in step S1402. Therefore, in step S1408, the MFP 101 updates the Job Holder information to information for identifying the MFP 101 on the LAN 110. For example, when the IP address corresponding to the network I/F 2 of the MFP 101 is stored in the Job Holder information in step S1402, the Job Holder information is updated to the IP address information for the network I/F 1 in step S1408.

FIG. 5 illustrates the bibliographic information 1201 generated in step S1402, which stores information for identifying the MFP 101 on the LAN 120. As a result of the update in step S1408, information for identifying the MFP 101 on the LAN 110 is stored in Job Holder, and the bibliographic information 1202 is generated.

In step S1409, the MFP 101 transmits the bibliographic information. More specifically, the bibliographic information transmission unit 413 transmits the bibliographic information to the bibliographic information management server 103 on the LAN 110. The processing exits this flowchart upon completion of the transmission of the bibliographic information.

Following step S1405, the input service 410 may confirm the bibliographic information transmission setting. According to the present exemplary embodiment, it is assumed that the bibliographic information for a job transmitted from the LAN 110 stores the transmission setting to be transmitted to the bibliographic information management server 103 on the LAN 110. Therefore, the MFP 101 determines that the bibliographic information is not transmitted to both bibliographic information management servers (NO in step S1407). Then, the processing exits this flowchart.

In the above-described flowchart, the MFP 101 confirms the setting about whether to transmit the bibliographic information to both bibliographic information management servers. As a result of the confirmation, the bibliographic information is transmitted to the bibliographic information management servers on the two networks or to the bibliographic information management server on either one network.

As a result, information such as the bibliographic information management tables 1300 and 1310 illustrated in FIG. 13 is managed by the bibliographic information management servers 103 and 107.

The processing for registering the bibliographic information in the bibliographic information management tables in the bibliographic information management servers, the processing for displaying a job list on the MFP subjected to job output, and the processing for reservation printing output are similar to those illustrated in FIGS. 9 to 11 according to the first present exemplary embodiment.

The authentication screen and the job list screen displayed on the operation unit 220 of the MFP have similar configurations to the examples illustrated in FIG. 7 although the contents of the job list are different.

As described above, according to the present exemplary embodiment, the MFP 101 connected to a plurality of networks transmits the bibliographic information for the print data received from the PC 102 connected to the LAN 110, to the bibliographic information management server 103 connected to the LAN 110. The MFP 101 also transmits the bibliographic information for the print data received from the PC 106 connected to the LAN 120, to the bibliographic information management server 103 and the bibliographic information management server 107 connected to the LAN 120. This enables printing the print data received from the PC 106 connected to the LAN 120, on the image forming apparatus connected only to the LAN 110.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-051244, filed Mar. 23, 2020, which is hereby incorporated by reference herein in its entirety.

What is claimed is:

1. A printing apparatus configured to perform communication via a secure first network and communication via a second network, the printing apparatus comprising:
one or more memories storing a set of instructions; and
one or more processors that execute the set of instructions to:
receive print data from a first terminal apparatus connected to the first network, via the first network, or from a second terminal apparatus connected to the second network, via the second network;
store the received print data in a storage device;
transmit information for first print data received via the first network to a first server via the first network, without via the second network, wherein the first server performs communication via the first network;
transmit information for second print data received via the second network to a second server via the second network, wherein the second server performs communication via the second network;
based on receiving a request for transmitting the first print data stored in the storage device from a second printing apparatus which is connected to the first network and is different from the printing apparatus, transmit the first print data to the second printing apparatus; and
based on receiving a request for transmitting the second print data stored in the storage device from a third printing apparatus which is connected to the second network and is different from the printing apparatus and the second printing apparatus, transmit the second print data to the third printing apparatus.

2. The printing apparatus according to claim 1, wherein, in a case where the print data is received via the first network, bibliographic information for the print data is transmitted to the first server.

3. The printing apparatus according to claim 1, wherein, in a case where the print data is received via the second network, bibliographic information for the print data is transmitted to the second server.

4. The printing apparatus according to claim 1,
wherein the instructions further cause the printing apparatus to:
retain a setting indicating whether to transmit bibliographic information for the print data not only to the second server but also to the first server in a case where the print data is received via the second network, and
wherein, in a case where the print data is received via the second network, and a setting indicating that the bibliographic information for the print data is transmitted not only to the second server but also to the first server is retained, the bibliographic information for the print data is transmitted to the first and second servers.

5. The printing apparatus according to claim 1, wherein the second server does not manage bibliographic information for the print data received by the printing apparatus via the first network.

6. The printing apparatus according to claim 1, wherein print data is received by using two network interfaces.

7. The printing apparatus according to claim 6, wherein the two network interfaces include an interface built in the printing apparatus and an interface external to the printing apparatus.

8. A printing system including an image forming apparatus that performs communication via a secure first network and communication via a second network, a first server that performs communication via the first network, and a second server that performs communication via the second network, the image forming apparatus comprising:
　first one or more memories storing a first set of instructions; and
　first one or more processors that execute the first set of instructions to:
　　receive print data from a first terminal apparatus connected to the first network via the first network, or from a second terminal apparatus connected to the second network via the second network;
　　store the received print data in a storage device;
　　transmit information for first print data received via the first network to the first server via the first network, without via the second network, wherein the first server performs communication via the first network;
　transmit information for second print data received via the second network to the second server via the second network, wherein the second server performs communication via the second network;
　　based on receiving a request for transmitting the first print data stored in the storage device from a second printing apparatus which is connected to the first network and is different from the printing apparatus, transmit the first print data to the second printing apparatus; and
　　based on receiving a request for transmitting the second print data stored in the storage device from a third printing apparatus which is connected to the second network and is different from the printing apparatus and the second printing apparatus, transmit the second print data to the third printing apparatus, the first server comprising:
　second one or more memories storing a second set of instructions; and
　second one or more processors that execute the second set of instructions to:
　　manage information for print data received from a plurality of image forming apparatuses including the image forming apparatus,
　the second server comprising:
　third one or more memories storing a third set of instructions; and
　third one or more processors that execute the third set of instructions to:
　　manage information for print data received from a plurality of image forming apparatuses including the image forming apparatus,
　wherein the first server manages the information for the print data received by the image forming apparatus via the first network, and
　wherein the second server does not manage the information for the print data received by the image forming apparatus via the first network.

9. A control method for a printing apparatus configured to perform communication via a secure first network and communication via a second network, the control method comprising:
　receiving print data from a first terminal apparatus connected to the first network, via the first network, or from a second terminal apparatus connected to the second network, via the second network;
　storing the received print data in a storage device;
　transmitting information for first print data received via the first network to a first server via the first network, without via the second network, wherein the first server performs communication via the first network;
　transmitting information for second print data received via the second network to a second server via the second network, wherein the second server performs communication via the second network;
　based on receiving a request for transmitting the first print data stored in the storage device from a second printing apparatus which is connected to the first network and is different from the printing apparatus, transmitting the first print data to the second printing apparatus; and
　based on receiving a request for transmitting the second print data stored in the storage device from a third printing apparatus which is connected to the second network and is different from the printing apparatus and the second printing apparatus, transmitting the second print data to the third printing apparatus.

10. A non-transitory computer readable storage medium on which is stored a computer program for making a computer execute a control method for a printing apparatus configured to perform communication via a secure first network and communication via a second network, the control method comprising:
　receiving print data from a first terminal apparatus connected to the first network, via the first network, or from a second terminal apparatus connected to the second network, via the second network;
　storing the received print data in a storage device;
　transmitting information for first print data received via the first network to a first server via the first network, without via the second network, wherein the first server performs communication via the first network;
　transmitting information for second print data received via the second network to a second server via the second network, wherein the second server performs communication via the second network;
　based on receiving a request for transmitting the first print data stored in the storage device from a second printing apparatus which is connected to the first network and is different from the printing apparatus, transmitting the first print data to the second printing apparatus; and
　based on receiving a request for transmitting the second print data stored in the storage device from a third printing apparatus which is connected to the second network and is different from the printing apparatus and the second printing apparatus, transmitting the second print data to the third printing apparatus.

11. The printing apparatus according to claim 1, wherein the first network and the second network are wireless networks.

* * * * *